(12) United States Patent
Hill

(10) Patent No.: US 9,797,541 B1
(45) Date of Patent: Oct. 24, 2017

(54) PIG STOPPING DEVICE

(71) Applicant: Kyle Hill, Beeville, TX (US)

(72) Inventor: Kyle Hill, Beeville, TX (US)

( * ) Notice: Subject to any disclaimer, the term of this patent is extended or adjusted under 35 U.S.C. 154(b) by 0 days.

(21) Appl. No.: 15/190,768

(22) Filed: Jun. 23, 2016

(51) Int. Cl.
    *F16N 27/00* (2006.01)
    *F16L 55/46* (2006.01)
    *B08B 9/055* (2006.01)

(52) U.S. Cl.
    CPC .............. *F16L 55/46* (2013.01); *B08B 9/055* (2013.01)

(58) Field of Classification Search
    CPC ........... F16K 47/08; F16L 55/46; B08B 9/055
    USPC ................................. 138/41, 97, 98
    See application file for complete search history.

(56) References Cited

U.S. PATENT DOCUMENTS

| | | | | |
|---|---|---|---|---|
| 1,077,449 A | * | 11/1913 | Keyes ........................... 160/134 |
| 3,363,616 A | * | 1/1968 | Baumgarten .......... F01M 11/04 |
| | | | | 123/198 R |
| 3,556,735 A | * | 1/1971 | Epelman ............. F01N 13/0097 |
| | | | | 181/231 |
| 4,016,620 A | | 4/1977 | Powers | |
| 4,113,050 A | * | 9/1978 | Smith ..................... F01N 1/083 |
| | | | | 138/41 |
| 5,242,587 A | * | 9/1993 | Barrington ............. B01D 35/06 |
| | | | | 204/664 |
| 5,809,603 A | | 9/1998 | White | |
| 7,185,678 B1 | * | 3/2007 | Stell ........................ F01N 1/082 |
| | | | | 138/41 |
| 8,033,300 B2 | * | 10/2011 | McCarty ................. F16K 47/08 |
| | | | | 137/625.3 |
| 8,316,500 B2 | | 11/2012 | Freeman et al. | |
| 8,650,695 B2 | | 2/2014 | Pruett et al. | |
| 2008/0105199 A1 | | 5/2008 | Martin et al. | |

* cited by examiner

*Primary Examiner* — Patrick F Brinson
(74) *Attorney, Agent, or Firm* — Global Intellectual Property Agency, LLC; Jordan Sworen

(57) ABSTRACT

A pig stopping device for stopping a pipeline inspection gauge in the receiving station of a pipeline is provided. The device provides a cylindrical frame sized to be inserted into the receiving station of a pipeline. The cylindrical frame includes a pair of opposing circular plates having inner surfaces connected by a plurality of elongated rods, thereby forming an interior volume within the cylindrical frame. The circular plates each comprise a plurality of apertures configured to allow the flow of liquid and debris therethrough and into the interior volume. A cage wraps around the exterior of the elongated rods, thereby enclosing the interior volume but allowing the flow of liquid therethrough. In this way, debris pushed into the interior volume of the pig stopping device by a pig or the flow of product in the pipeline is caught therein and prevented from flowing into a bypass line of the receiving station.

20 Claims, 4 Drawing Sheets

PIG STOPPING DEVICE

BACKGROUND OF THE INVENTION

The present invention relates to pig stopping devices for pigging systems. More specifically, the present invention relates to a pig stopping device sized to be inserted into the receiving station of a pigging pipeline for the purpose of stopping a pig at a point along the receiving station such that the pig does not block the flow of production through a bypass valve.

Pipeline inspection gauges or pigs are devices employed in pipeline inspection gauging or pigging systems for the purpose of performing various maintenance functions in pipelines, including but not limited to cleaning and inspecting pipelines. These functions are accomplished by inserting the pig into a pig launcher or launching station, which is an oversized section in a pipeline that reduces to the normal diameter. The launching station is then closed and the pressure-driven flow of the product in the pipeline is used to push it along the pipe until it reaches a receiving station, also known as the pig catcher. At the receiving station there is a bypass line. The bypass line is the part of the pigging system that enables the product to keep flowing through the pipeline without stopping while a pig is being utilized. However, the bypass line may be become blocked by the pig once the pig reaches the receiving station. Moreover, the movement of volume of product flowing from the pipeline through the bypass lines may exert a pressure on the pig, which may lodge the pig in the bypass line. Such blocking or lodging reduces production and may require manual removal or dislodgement of the pig. Therefore, there is a need in the art for a device configured to stop a pig in the receiving station of a pigging pipeline, such that once the pig is therein, the pig is not capable of blocking or getting lodged in the bypass line.

SUMMARY OF THE INVENTION

In view of the foregoing disadvantages inherent in the known types of pig stopping devices now present in the prior art, the present invention provides a pig stopping device wherein the same can be utilized for providing convenience for a user when pigging pipelines. The present system comprises a pig stopping device, comprising a first circular plate having a plurality of apertures, a second circular plate having a plurality of apertures, a plurality of elongated rods connecting the first circular plate and the second circular plate, the first circular plate attached to a first distal end of each of the plurality of elongated rods and the second circular plate attached to a second distal end of each of the plurality of elongated rods, a mesh disposed about the plurality of elongated rods, the mesh defining an enclosed interior volume, wherein the mesh comprises a plurality of apertures sized to allow fluids therethrough and retain debris in the interior volume thereof.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
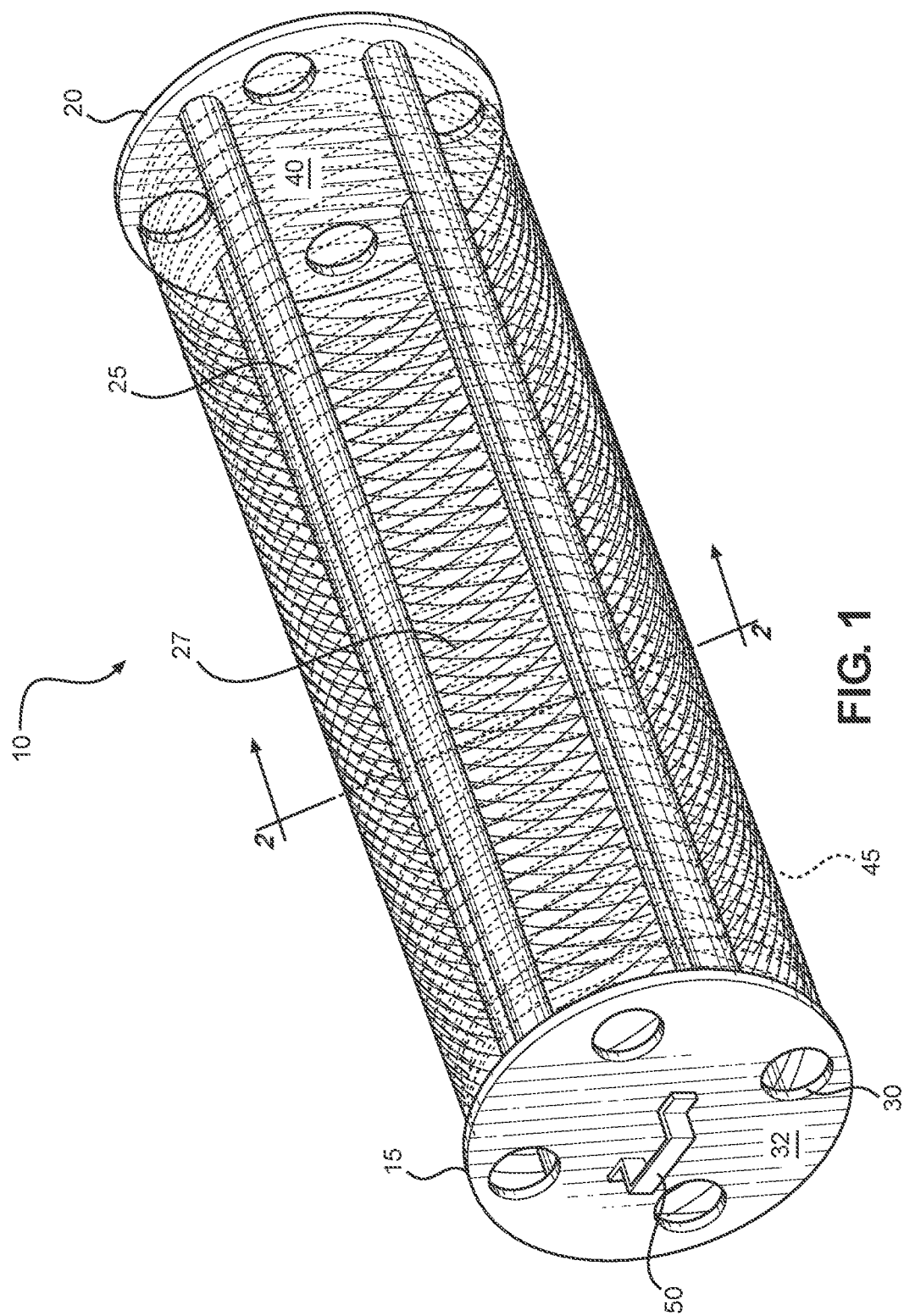
FIG. 1 shows a perspective view of the pig stopping device.

Reference is made herein to the attached drawings. Like reference numerals are used throughout the drawings to depict like or similar elements of the pig stopping device. The figures are intended for representative purposes only and should not be considered to be limiting in any respect.

Figure 2:
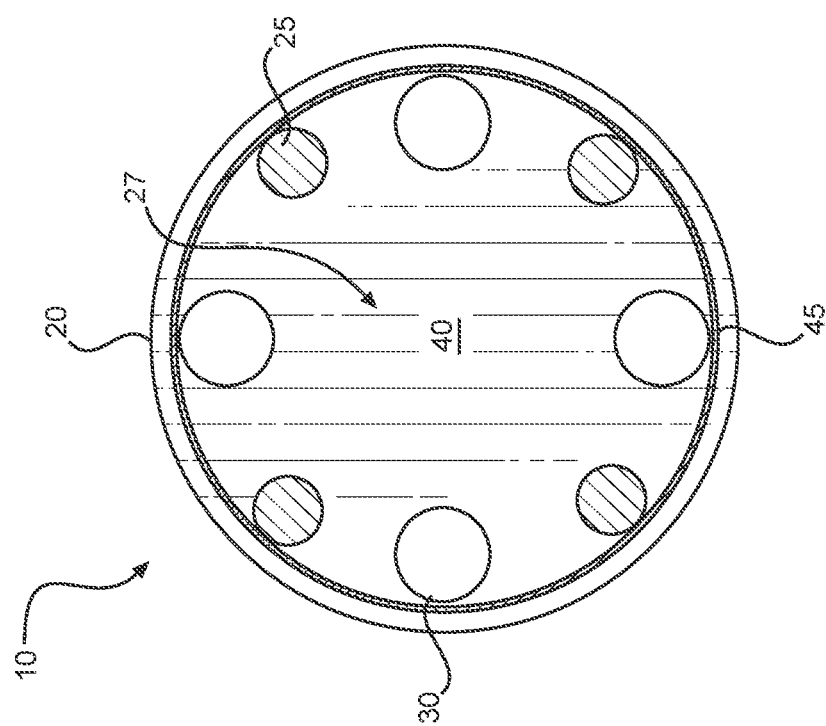
FIG. 2 shows a cross-sectional view of the pig stopping device along line 2-2.

Referring now to FIGS. 1 and 2, there are shown perspective and cross-sectional views of the pig stopping device, respectively. The pig stopping device 10 provides a device for stopping a pipeline inspection gauge, or pig, in the receiving station of a pipeline such that the pig is not capable of blocking or getting lodged in the bypass line of the pipeline. The pig stopping device 10 comprises a cylindrical frame sized and configured to be inserted into the receiving station of a pipeline and rest flush against the interior walls of the pipeline. The cylindrical frame is defined by a pair of opposing circular plates 15, 20 and a plurality of elongated rods 25. The opposing circular plates 15, 20 comprise a first circular plate 15 and a second circular plate 20, wherein the first circular plate 15 is connected to the second circular plate 20 by the elongated rods 25, thereby forming an interior volume 27 between the circular plates 15, 20 and the elongated rods 25. In one embodiment, the circular plates 15, 20 each have a diameter of 12 inches. In another embodiment, the circular plates 15, 20 each have a diameter of 14 inches. In other embodiments, the circular plates 15, 20 each have a diameter of 16 inches. In this way, the cylindrical frame comprises several embodiments having different diameters sized to fit flush within receiving stations having different pipe diameters. In one embodiment, the elongated rods 25 each have a linear length of 4 feet. In another embodiment, the elongated rods 25 each have a linear length of 5 feet. In other embodiments, the elongated rods 25 each have a linear length of 6 feet. In this way, the cylindrical frame comprises several embodiments having different linear lengths sized to extend past the bypass lines of differently sized receiving stations. The circular plates 15, 20 and elongated rods 25 are composed of a metal material, such as steel, brass, iron, aluminum, or any combination of same. In one embodiment, the circular plates 15, 20 are composed of the same material as the elongated rods 25, wherein the circular plates 15, 20 and the elongated rods are integrally formed, such as by casting.

Each of the circular plates 15, 20 comprise a plurality of apertures 30 sized and configured to allow the flow of fluids, such as oil, and debris therethrough and into the interior volume of the pig stopping device 10. In one embodiment, each of the apertures 30 comprises a diameter of 2 inches, such that it is capable of allowing pieces of a broken pig, iron sulfide build up, and paraffin buildup therethrough. In another embodiment, the apertures 30 are symmetrically aligned for further facilitating the flow of debris and water into and through the pig stopping device 10. Each of the circular plates 15, 20 further comprises an outer surface 32 and an inner surface 40. The rods 25 are disposed adjacent to the perimeter of the inner surface 40 and extend horizontally along a longitudinal axis, whereby they interconnect the circular plates 15, 20 to one another. The rods 25 are evenly spaced apart from one another along the perimeter of the inner surfaces 40 of the circular plates 15, 20, such that the rods 25 surround the interior volume 27 of the pig stopping device 10.

The pig stopping device 10 further comprises a mesh cage 45 having a mesh-like structure disposed around the exterior of the elongated rods 25, wherein the mesh cage 45 is affixed adjacent to the perimeter edges of the circulate plate 15, 20 and wraps around the exterior of the elongated rods, thereby enclosing the interior volume of the device 10. The mesh cage 45 comprises a plurality of apertures sized to allow the flow of fluids therethrough, while catching and trapping the buildup and debris and other solid particulate materials in the fluids. In this way, the mesh cage 45 prevents any build up or debris from flowing therethrough and into other auxiliary pipelines, such as bypass lines. For example, in one embodiment, the apertures of the mesh cage 45 comprise a diameter of 0.5 inches, thereby preventing the flow of fragmented pig pieces, iron sulfide build up, and paraffin build up therethrough, but at the same time allowing the flow of product in the pipeline therethrough and into the bypass line. In one embodiment, the mesh cage 45 is affixed to the exterior of the elongated rods 25. In another embodiment, the mesh cage 45 is unattached to the rods 25 and rests against the exterior of the elongated rods 25, such that the mesh cage 45 makes contact with the elongated rods 25. In another embodiment, the mesh cage 45 is an interlaced network of wire composed of metal, such as steel, brass, aluminum, iron, or any combination thereof. In alternative embodiments, the mesh cage 45 is an interlaced network of thread composed of a polymeric material, such as nylon, polyetheretherketone, phenolic resin, polystyrene, polyethylene, polycarbonate, polytherimide, polysulfone, polyphenylsulfone, polyvinyl chloride, or any combination thereof. In one embodiment, the pig stopping device 10 further comprises a handle 50 disposed on the first circular plate 15 for removing the device 10 from the receiving station of a pipeline.

Figure 3:
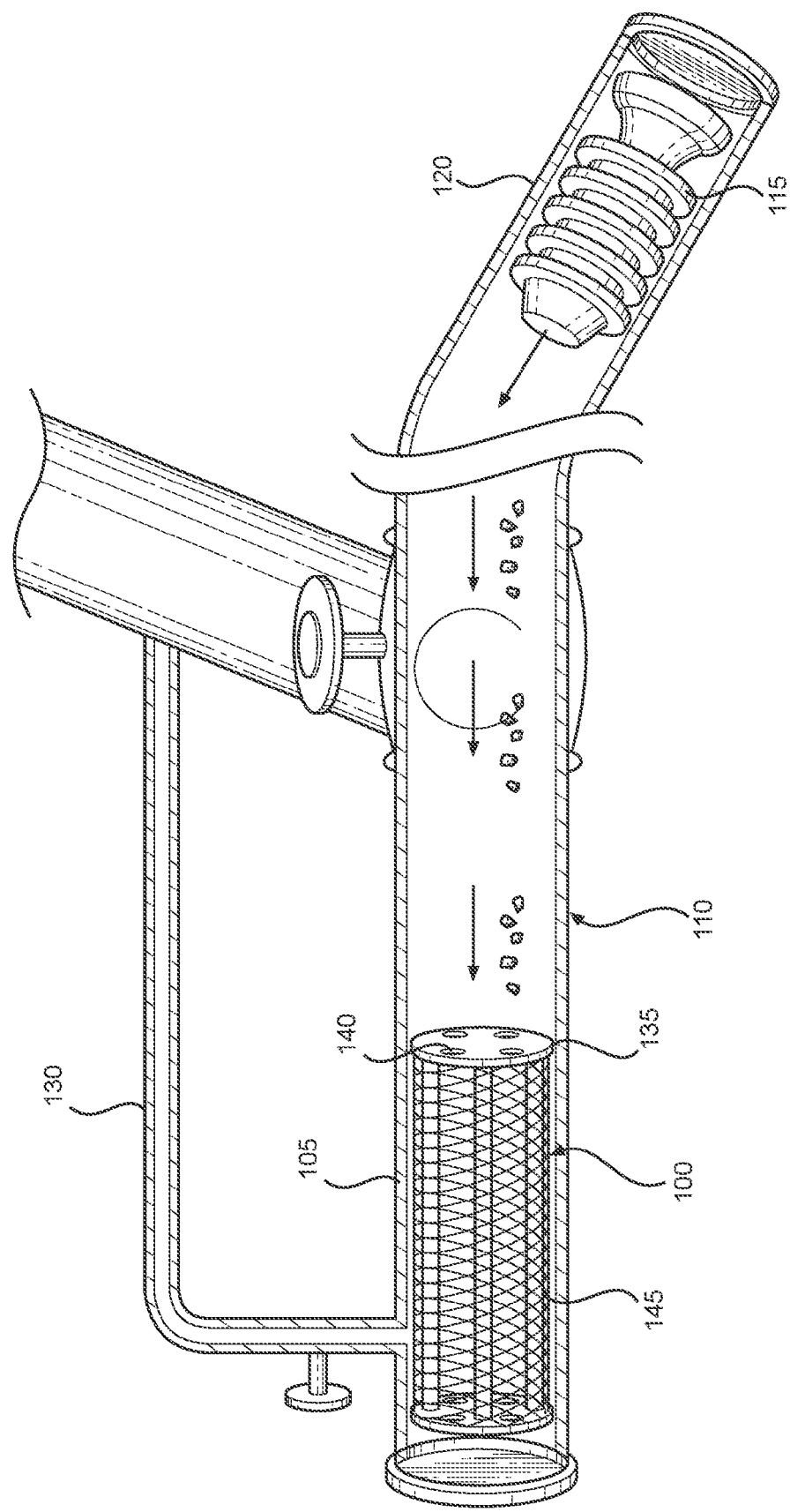
FIG. 3 shows a perspective view of the pig stopping device as inserted into the receiving station of a pipeline.
Figure 4:
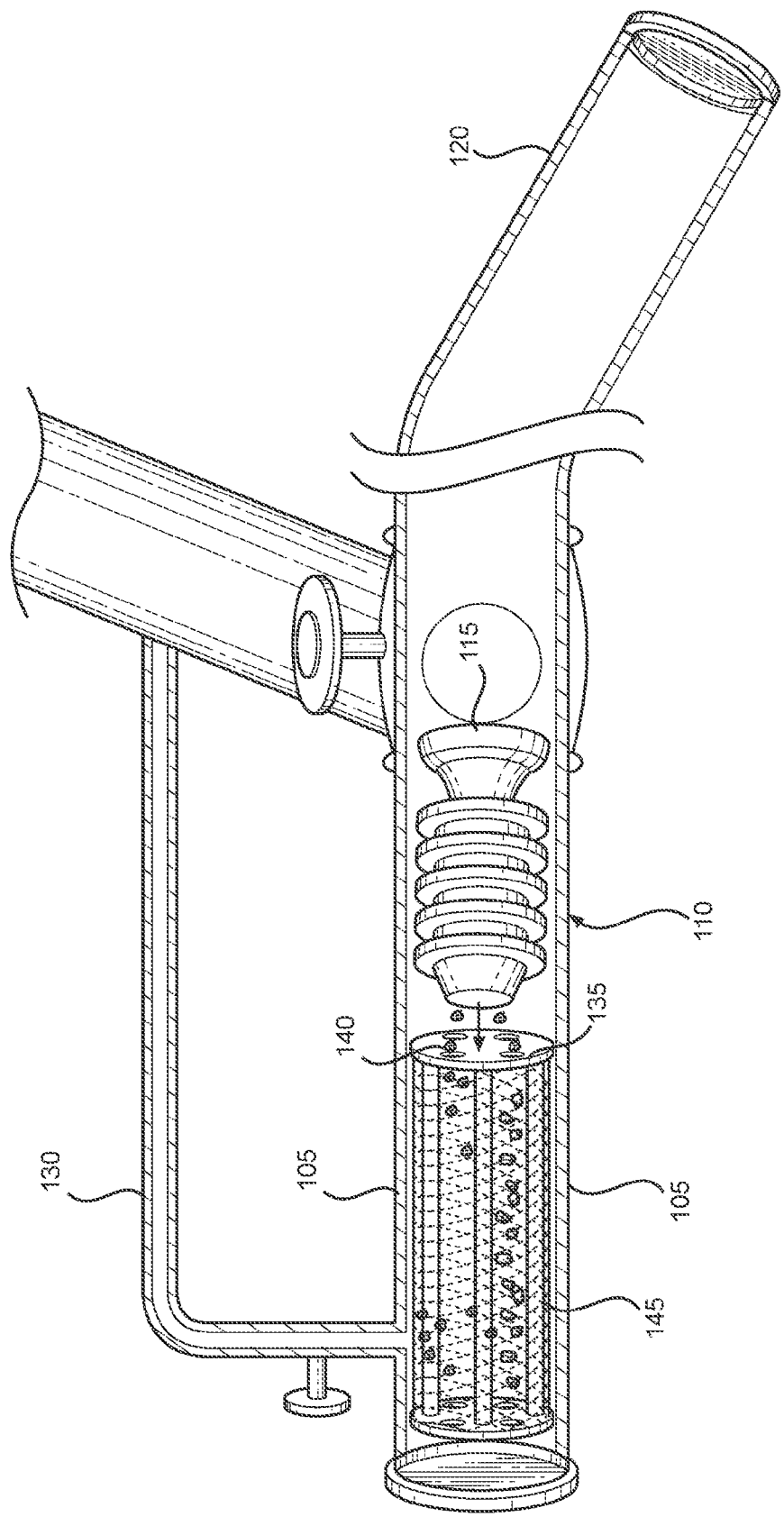
FIG. 4 shows a perspective view of the pig stopping device in use to prevent a pig from blocking the bypass line in a pipeline.

Referring now to FIGS. 3 and 4, there are shown views of the pig stopping device in use. In operation, the pig stopping device 100 functions to stop a pig 115 from reaching a bypass line 130 of a receiving station 105 of a pipeline 110. In one use, the pig stopping device 100 is inserted into the interior volume of the receiving station 105 of the pipeline 110 before a pig 115 is launched from a launching station 120 of the pipeline 110. Once inserted, the pig 115 is launched through the pipeline 110, capturing buildup and debris and sliding it therewith towards the receiving station 105 of the pipeline 110. Once the pig 115 reaches the receiving station 105, a circular plate 135 of the pig stopping device 100 stops the pig 115 in its path before it moves underneath the bypass line 130. The buildup and debris carried along by the pig 115 is pushed through the apertures 140 and into the interior volume of the pig stopping device 100. The mesh cage 145 of the pig stopping device 100 prevents the debris and buildup moved into the interior volume of the pig stopping device 100 from flowing into the bypass line 130. In this way, the pig stopping device 100 not only halts the pig 115 before it reaches the bypass line 130, but also retains the buildup and debris caught by the pig therein, thereby preventing the bypass line 130 from getting blocked by the pig 115, debris buildup, or a combination thereof. Once the pigging process is complete, the pig stopping device 100 can be removed from the receiving station 105 of the pipeline 110 via a handle thereon.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pig stopping device, comprising:
a first circular plate having a plurality of apertures;
a second circular plate having a plurality of apertures;
a plurality of elongated rods connecting the first circular plate and the second circular plate, the first circular plate attached to a first distal end of each of the plurality of elongated rods and the second circular plate attached to a second distal end of each of the plurality of elongated rods;
a mesh cage disposed about the plurality of elongated rods, the mesh cage defining an enclosed interior volume;
wherein the mesh cage comprises a plurality of apertures having a diameter sized to allow fluids therethrough and retain debris in the interior volume thereof.

2. The pig stopping device of claim 1, wherein the first and second circular plates have a diameter sized to fit into a receiving station of a pipeline and rest flush with the interior walls of the pipeline.

3. The pig stopping device of claim 2, wherein the diameter of the circular plates ranges from 12-16 inches.

4. The pig stopping device of claim 1, wherein the elongated rods have a linear length sized to extend past a bypass line of a receiving station of a pipeline.

5. The pig stopping device of claim 4, wherein the linear length of the elongated rods ranges from 4-6 feet.

6. The pig stopping device of claim 1, wherein the elongated rods are affixed adjacent to a perimeter of an inner surface of each of the first circular plate and the second circular plate.

7. The pig stopping device of claim 6, wherein the elongated rods are evenly spaced apart on the inner surfaces and extend horizontally therefrom, the elongated rods connecting the inner surface of the first circular plate to the inner surface of the second circular plate.

8. The pig stopping device of claim 1, wherein the mesh cage is affixed adjacent to a perimeter of an inner surface of each of the first circular plate and the second circular plate.

9. The pig stopping device of claim 1, comprising four elongated rods.

10. The pig stopping device of claim 1, wherein the plurality of apertures on the first circular and second circular plates are symmetrically aligned.

11. The pig stopping device of claim 1, wherein the plurality of apertures on the first circular plates and the second circular plates have a diameter sized to allow debris build-up therethrough.

12. The pig stopping device of claim 11, wherein the diameter of the plurality of apertures on the first and second circular plates is 2 inches.

13. The pig stopping device of claim 1, wherein the mesh is attached to the elongated rods and wraps around an exterior thereof.

14. The pig stopping device of claim 1, wherein the mesh is unattached to the elongated rods and wraps around an exterior of the elongated rods resting thereagainst.

15. The pig stopping device of claim 1, wherein the diameter of the plurality of apertures of the mesh cage range from 0.25-0.75 inches.

16. The pig stopping device of claim 1, wherein the circular plates are composed of a metal material selected from the group consisting of steel, brass, aluminum, and iron.

17. The pig stopping device of claim 1, wherein the elongated rods are composed of a metal material selected from the group consisting of steel, brass, aluminum, and iron.

18. The pig stopping device of claim 1, wherein then mesh comprises an interlaced network of wire composed of a metal selected from the group consisting of steel, brass, aluminum, and iron.

19. The pig stopping device of claim 1, wherein the mesh of the cage comprises an interlaced network of thread composed of polymeric material selected from the group consisting of nylon, polyetheretherketone, phenolic resin, polystyrene, polyethylene, polycarbonate, polytherimide, polysulfone, polyphenylsulfone, and polyvinyl chloride.

20. The pig stopping device of claim 1, further comprising a handle disposed on a circular plate.

\* \* \* \* \*